Oct. 14, 1941.   W. C. EDDY   2,259,415
CAMERA FOCUSING DEVICE
Filed Feb. 5, 1941
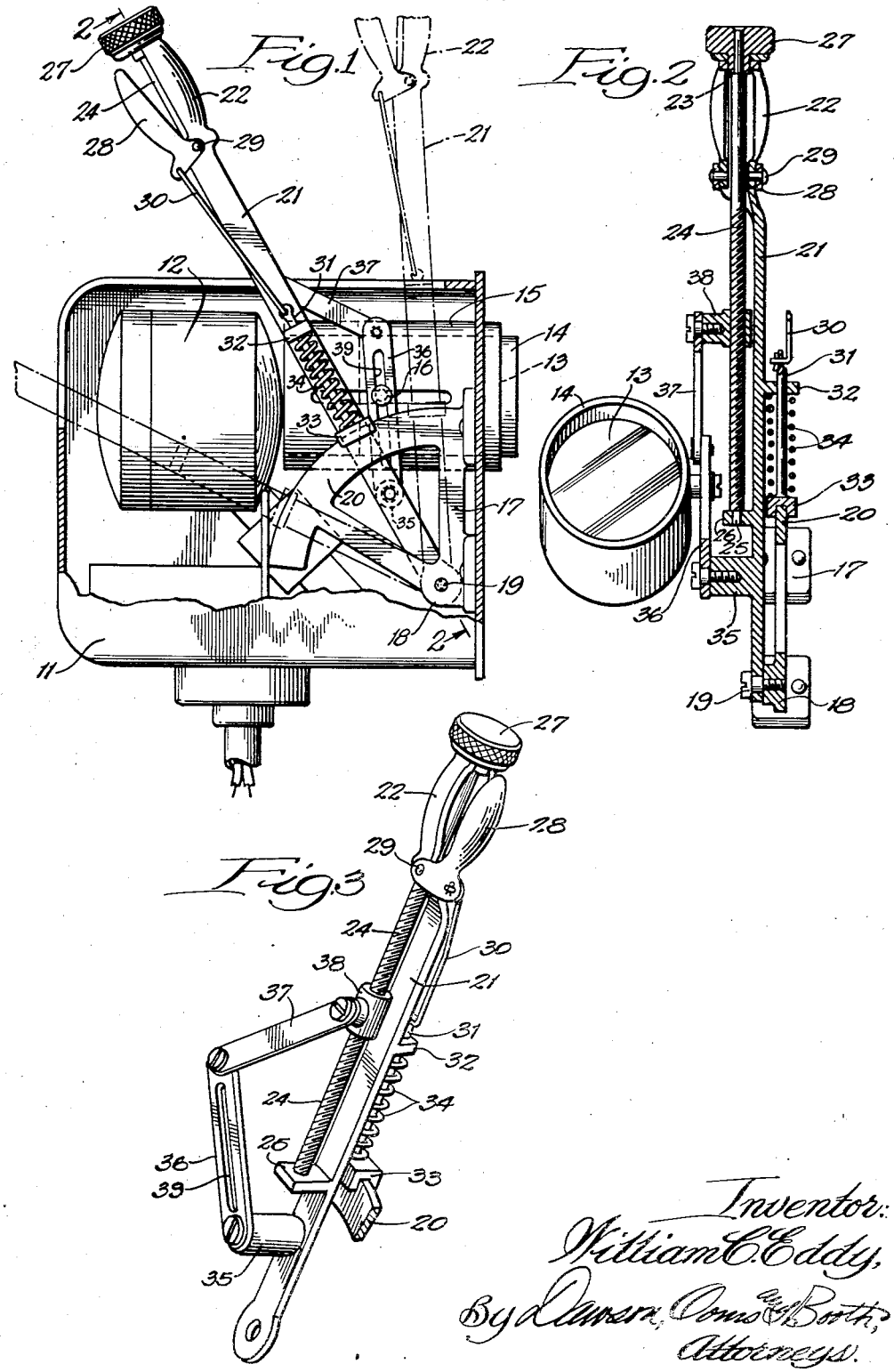
Inventor:
William C. Eddy,
By Dawson, Ooms & Booth,
Attorneys.

Patented Oct. 14, 1941

2,259,415

UNITED STATES PATENT OFFICE 2,259,415

CAMERA FOCUSING DEVICE

William C. Eddy, Kenilworth, Ill., assignor to Balaban & Katz Corporation, Chicago, Ill., a corporation of Delaware Application February 5, 1941, Serial No. 377,415

5 Claims. (Cl. 95—45)

This invention relates to cameras and is particularly applicable to cameras employed in television. The object of the invention is to provide a focusing device by which the lens employed in viewing the subject to be photographed or to be transmitted and projected by television can be quickly and precisely focused upon the subject. The apparatus of this invention is also readily applicable to cameras employed in conventional still and motion picture photography.

This invention is particularly suitable for use in television cameras because in the operation of television cameras no pre-focusing is available, and the focusing must be performed while the subject is being transmitted and projected. In the operation of television cameras the subject is always moving and it is necessary for the television camera in following this movement, no matter how fast or in what direction, to maintain the subject in focus. It is one of the objects of this invention to enable the operator to so manipulate the lens as to keep the subject within focus at all times by simple natural movements of the focusing device.

Another object of the invention is to provide a focusing device which can be easily and inexpensively made, which has few moving parts, and is simple in construction.

Another object of the invention is to provide a focusing mechanism which can be manipulated with one hand of the operator and which will permit the substantial adjustments to be effected by a single sweep of the arm and the precise adjustments to be made by movement of the fingers of the operator.

Another object of the invention is to provide a focusing device which eliminates the use of cranks and other rotatable members to move the lens carrier which require the recollection of the operator as to the direction of rotation.

A further object of the invention is to provide a focusing device which can be manipulated with a single hand to provide a complete range of movement for the lens and by which the lens can be moved quickly and uniformly within that range.

A further object of the invention is to provide a focusing device by which drag can be applied to the moving parts in order to prevent abrupt and jerky motion, and the amount of drag can be readily controlled by the same hand which is operating the focusing device.

Other objects, advantages and capabilities of the invention will appear from the following description of a preferred embodiment thereof, taken in conjunction with the accompanying drawing of the invention installed in a television camera, in which:

Figure 1 is a side elevation of the focusing device arranged in a television camera, shown partially in section and with the operating lever of the focusing device shown in various positions by broken lines;

Fig. 2 is a sectional view of the focusing device taken on the line 2—2 of Fig. 1; and Fig. 3 is a view in perspective of the focusing device removed from the camera.

Referring to the drawing, the reference numeral 11 indicates the case or cover of a television camera which is shown in Fig. 1 cut away to disclose the focusing device of this invention. The camera is provided with the usual iconoscope 12, which is a photo-electric reproducing tube. The iconoscope is mounted behind the lens 13 by which the subject to be reproduced is focused upon the mosaic of the iconoscope.

The lens 13 is borne in the usual cylindrical lens carrier 14 which is suitably mounted within the sleeve 15 secured within the television camera. At one side of the lens carrier 14 is mounted a pin or screw 16 by which movement is imparted to the lens carrier 14 by means of the focusing mechanism.

Within the television camera 11 is mounted a bracket 17, which, in the embodiment of the invention shown in the accompanying drawing, is in the form of a quadrant with a journal 18 for a pivot 19 at the point about which the segment 20 is generated. The segment 20 forms a guide bar for the focusing device and also a braking surface against which the brake shoe 33 of the focusing mechanism is applied to provide the desired drag for the focusing device.

Pivoted upon the pivot 19 is the focusing lever 21. This lever terminates at its upper end in the handle 22. The handle is bored at its upper end 23 to form a bearing for the threaded shaft 24. The lower end of the threaded shaft terminates in the gudgeon 25 which is journaled in the bracket 26 upon the hand lever 21. The threaded shaft is secured to and rotated by the milled knob 27 mounted upon the outer end of the hand lever.

Also secured to the hand lever 21 is the braking lever 28 which is pivoted at 29 to the hand lever, so that as the handle of the hand lever is grasped the braking lever 28 may be operated simultaneously therewith. Operated by the braking lever 28 is the connecting rod 30 by which the brake rod 31 may be reciprocated in the bracket 32 made integral with the hand lever 21. The brake rod 31 terminates in the brake shoe 33 which is forced against the segment 20 by means of the coil spring 34 which surrounds the brake rod 31, and can be retracted by manipulation of the braking lever 28.

Also secured to the hand lever 21 is the boss 35 upon which is pivoted the slotted link 36, which with the link 37 forms a toggle. The link 37 is pivoted to the threaded collar 38 which surrounds and is engaged by the threaded shaft 24. The slot 39 in the link 36 is designed to receive the screw or pin 16 which projects from the lens carrier 14.

Operation of the focusing device

With the parts of the focusing device assembled as shown in full lines in Fig. 1, the lens carrier is in a middle position in the camera. The brake shoe 33 pressing against the segment 20 will ordinarily maintain the lens carrier in a fixed position. If it is desired to move the lens forwardly the hand lever 21 is moved forward and will impart forward movement to the lens carrier by means of the links 36 and 37. If it is desired to reduce the friction between the brake shoe and the segment, this can be done by pressing the braking lever 28 toward the hand lever 21 simultaneously as the hand lever 21 is being moved. Release of the braking lever 28 will immediately force the braking shoe against the segment.

In the event that it is desired to place some drag upon the movement of the hand lever 21, the pressure of the brake shoe 33 against the segment 20 can be readily controlled and varied by the extent to which the braking lever 28 is pressed toward the hand lever 21.

When an approximate adjustment of the focus is obtained, which is usually observed by means of a conventional view finder, either electrical or optical, a more precise adjustment can be effected by rotation of the knurled knob 27 by means of the fingers of the same hand by which the lever 21 is operated. By rotation of this knob the threaded shaft 24 is rotated and movement thereby imparted to the threaded collar 38 and the links 36 and 37 secured thereto. By this means the lens carrier 14 can be moved very precisely by a natural movement of the fingers and without any movement whatsoever of the hand lever 21. An extremely precise adjustment can be thus effected.

While this precise adjustment is being effected, the pressure of the hand upon the braking lever 28 and the pressure of the brake shoe 33 on the segment 20 prevents any rough or undesired movement of the lens, and confines the movement of the lens to that effected by the micrometer adjustment.

It can be readily observed that the apparatus is so designed that with a single hand the operator may grasp the handle 22 and the braking lever 28 and encircle the knurled knob 27 with the thumb and forefinger. The apparatus thus presents a ready means by which the complete and precise focusing of the lens can be instantly effected by the use of a single hand in the most natural manner, as the substantial motion to be imparted to the lens can be produced by movement of the arm and the precise manipulation effected by the more accurate movements of which the fingers are capable.

While there are shown and described certain embodiments of the invention, it is to be understood that it is capable of many modifications. Changes, therefore, in the construction and arrangement may be made without departing from the spirit and scope of the invention as defined in the appended claims.

Having thus described my invention, what I claim as new and desire to secure by Letters Patent is:

1. A focusing device for a camera having a lens carrier, comprising a lever mounted on the camera for moving said lens carrier in a line perpendicular to the focal plane of the lens to effect approximate focusing, toggle linkage mounted upon said lever and movable therewith connecting said lever to said lens carrier, and means upon said lever for operating said toggle joint to impart movement to said lens carrier for precise focusing without moving said lever.

2. A focusing device for a camera having a movable lens carrier mounted thereon, comprising a lever pivotally mounted upon said camera, toggle linkage mounted upon said lever and connected to said lens carrier, said lever being movable to move the lens carrier for approximate focusing, a brake mounted upon said lever, means upon said lever to release said brake, and means upon aid lever to operate said toggle linkage to impart movement to said lens carrier for precise focusing without moving said lever.

3. A focusing device for a camera having a lens carrier and a pin projecting from said lens carrier, comprising a lever for moving said lens carrier for approximate focusing, a brake upon said lever, a slotted toggle arm pivoted to said lever and connected to said lens carrier by said pin, a second toggle arm pivoted at one end to said slotted toggle arm and pivoted at the other end to a threaded collar, a threaded shaft upon said lever passing through and engaging said threaded collar, and means secured to said threaded shaft and mounted upon said lever to operate said toggle arms and to move said lens carrier for precise focusing without moving said lever.

4. A focusing device for a camera comprising a lens carrier movable in a line perpendicular to the focal plane of the lens, a lever on the camera pivoted at one end and movable about its pivot, linkage connected to the lever intermediate its ends and connecting the lever to the lens carrier, the lever being movable to effect rough focusing of the lens, and manually operable means mounted upon said lever and connected with a member of said linkage to move the lens carrier, through said linkage, without moving the lever, thus effecting precise focusing.

5. A focusing device for a camera comprising a lens carrier movable in a line perpendicular to the focal plane of the lens, a lever on the camera pivoted at one end and movable about its pivot, linkage connected to the lever intermediate its ends and connecting the lever to the lens carrier, the lever being movable to effect rough focusing of the lens, and means comprising a manually operable threaded shaft upon said lever with a member of said linkage connecting said shaft with said lens carrier, said means adjusting the linkage to move the lens carrier without moving the lever, thus effecting precise focusing.

WILLIAM C. EDDY.